United States Patent
Takahashi

[11] 3,774,989
[45] Nov. 27, 1973

[54] PATTERN DISPLAY APPARATUS
[75] Inventor: Isao Takahashi, Watarai-gun, Japan
[73] Assignee: ISE Electronics Corporation, Ise City, Mie Prefecture, Japan
[22] Filed: Oct. 20, 1972
[21] Appl. No.: 299,428

[30] Foreign Application Priority Data
Oct. 23, 1971 Japan................................ 46/84242

[52] U.S. Cl..... 350/160 LC, 313/109.5, 317/234 R, 340/160 EL
[51] Int. Cl............................................... G02f 1/16
[58] Field of Search ............. 350/160 LC; 317/234, 317/5.4, 234, 22; 313/109.5; 340/166 EL

[56] References Cited
UNITED STATES PATENTS
3,615,949  10/1971  Hicks................................ 317/234
3,674,342  7/1972   Castellano...................... 350/160 LC
3,499,112  3/1970   Heilmeier et al............. 350/160 LC Primary Examiner—Edward S. Bauer
Attorney—C. Yardley Chittick et al.

[57] ABSTRACT

In a pattern display apparatus of the class comprising a pair of insulator substrates, one of which being transparent, a plurality of row and column electrodes which are disposed in a matrix between the insulator substrates, and a liquid crystal filled in the space between the insultor substrates, the row and column electrodes are provided with a plurality of parallel interleaved teeth at respective cross-points therebetween.

4 Claims, 4 Drawing Figures

PATENTED NOV 27 1973 3,774,989

3,774,989

PATTERN DISPLAY APPARATUS

BACKGROUND OF THE INVENTION

This invention relates to pattern display apparatus and more particularly to pattern display apparatus utilizing liquid crystals.

As shown in FIG. 1, a conventional pattern display apparatus utilizing a liquid crystal comprises a transparent insulator substrate 1, a first electrode group $2_1$ to $2_4$ disposed in parallel on the substrate and constituting row electrodes, an insulating spacer 3 in the form of a rectangular frame disposed on the first electrode group, a second electrode group $4_1$ to $4_4$ disposed at right angles with respect to the first electrode group and constituting column electrodes, and an opaque insulator substrate 5 overlying the second electrode group. The space defined by the insulator substrates 1 and 5 and spacer 3 is filled with a liquid crystal 6.

Upon selective energization of the electrodes belonging to the first and second groups, the liquid crystal at the cross-points between the selected electrodes luminescences to display a predetermined pattern.

With this construction, since the electrodes of the first and second groups are disposed at right angles on the upper and lower sides of the spacer frame 3, it is difficult to correctly dispose these electrodes in position. Furthermore, in a large size display apparatus surface irregulaties of the substrates cause the electrodes to contact with each other or non-uniform light emission. Accordingly, the substrates are required to have smooth and flat surfaces. Since the electrodes are sandwiched between opposite substrates it is not easy to connect the electrodes with external circuits. It is also necessary to make small the spacing between electrode groups in the case of small size apparatus.

SUMMARY OF THE INVENTION

It is an object of this invention to provide an improved pattern display apparatus wherein the matrix of the electrodes can be readily formed regardless of the flatness or irregularity of the substrate.

Another object of this invention is to provide an improved electrode construction which renders easy fabrication of large size display apparatus utilizing liquid crystals.

According to this invention, there is provided a pattern display apparatus of the class comprising a pair of insulator substrates, one of which being transparent, a plurality of row electrodes and a plurality of column electrodes which are disposed in a matrix between the pair of insulator substrates, and a liquid crystal filled in the space between the pair of insulator substrates, characterized in that a plurality of interleaved teeth are provided for the row electrodes and column electrodes at respective cross-points therebetween.

DESCRIPTION OF THE PREFERRED EMBODIMENTS

Figure 1:
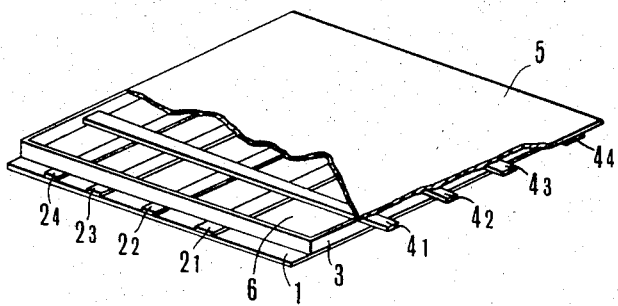
FIG. 1 is a diagrammatic perspective representation, partly broken away, of a conventional display apparatus utilizing a liquid crystal.
Figure 2:
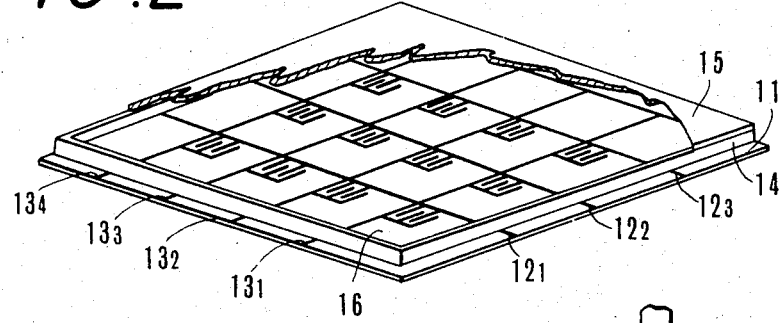
FIG. 2 is a similar view of the display apparatus embodying the invention.

A preferred embodiment of this invention shown in FIG. 2 comprises a transparent insulating substrate 11 and a matrix of electrodes 12 and 13. The row electrode 12 includes a plurality of parallel electrodes $12_1$, $12_2$ and $12_3$ whereas the column electrode 13 includes a plurality of parallel electrodes 13 which are disposed at substantially right angles with respect to the row electrode. At each cross-point, the row and column electrodes are constructed in the form of interleaved combs, as diagrammatically shown in FIG. 3. A spacer 14 in the form of a rectangular frame 14 is disposed on the substrate 11 to surround the electrode groups, and an opaque insulator substrate 15 is mounted on the spacer 14. As before, the space defined by substrates 11 and 15 and spacer 14 is filled with a liquid crystal.

Figure 3:
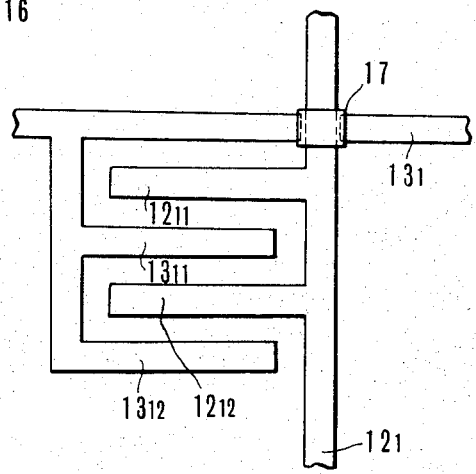
FIG. 3 shows an enlarged plan view of a portion of the electrodes.
Figure 4:
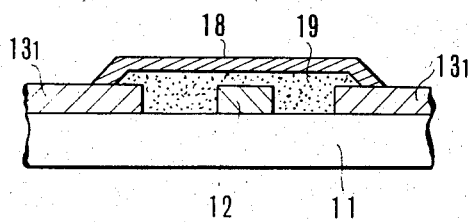
FIG. 4 is a partial sectional view of the display apparatus shown in FIG. 2.

The detail of the electrode groups 12 and 13 will be described with reference to FIGS. 3 and 4. As shown in FIG. 3, electrode $12_1$ is provided with spaced apart teeth $12_{11}$ and $12_{12}$ while the electrode $13_1$ is provided with teeth $13_{11}$ and $13_{12}$ which are parallel with teeth $12_{11}$ and $12_{12}$ and are interleaved therewith. At the cross-point 17 between electrodes $12_1$ and $13_1$, a gap is provided in electrode $13_1$ and the electrode $12_1$ is passed through the gap. Two sections of the electrodes $13_1$ are connected electrically by means of a conductive bridging member 18. The space beneath the bridging member 18 is filled with a solid insulation. Instead of providing the gaps in the row electrodes, the gaps may be formed in the column electrodes.

When a potential is impressed across electrodes $12_1$ and $13_1$, an electric field is established between interleaved teeth $12_{11}$, $13_{11}$, $12_{12}$ and $13_{12}$ to cause the liquid crystal therebetween to luminescence.

Instead of mounting electrode groups on the transparent insulator substrate 14, it will be clear that the electrode groups may be mounted on the opaque insulator substrate 15.

According to this invention, it is possible to readily form the matrix of the electrodes on the substrate irrespective of its flatness or irregularity. Such a matrix can be formed by any well known technique such as printing or vapour deposition. For this reason, it is possible to readily manufacture large size display apparatus with less cost. The display apparatus of this invention can be used in many applications such as table type electronic computors, graphic display apparatus or the like.

Although the invention has been shown and described in terms of a preferred embodiment it will be clear that many changes and modifications may be made without departing from the true spirit and scope of the invention as defined in the appended claims.

What is claimed is:

1. In a pattern display apparatus of the class comprising a pair of insulator substrates, one of which being transparent, a plurality of row electrodes and a plurality of column electrodes which are disposed in a matrix between said pair of insulator substrates, and a liquid crystal filled in the space between said pair of insulator substrates, the improvement which comprises a plurality of parallel interleaved teeth provided for said row electrodes and column electrodes at respective cross-points therebetween.

2. The pattern display apparatus according to claim 1 wherein each one of said row or column electrodes is provided with a gap at the cross-point and each column or row electrode is extended through said gap and two sections of each electrode on the opposite sides of said gap is electrically interconnected by a bridging member.

3. The pattern display apparatus according to claim 2 wherein said gap beneath said bridging member is filled with a solid insulator.

4. The pattern display apparatus according to claim 1 wherein a spacer in the form of a rectangular frame is provided between said pair of insulator substrate to surround said matrix of electrodes and said liquid crystal is filled in the space defined by said pair of insulator substrates and said spacer.

* * * * *